(12) United States Patent
Arndt et al.

(10) Patent No.: US 8,283,952 B2
(45) Date of Patent: Oct. 9, 2012

(54) CIRCUIT ARRANGEMENT

(75) Inventors: Bastian Arndt, Regensburg (DE); Johann Falter, Wenzenbach (DE); Ralf Foerster, Regensburg (DE); Franz Laberer, Regensburg (DE); Gunther Wolfarth, Regensburg-Harting (DE)

(73) Assignee: Continental Automotive GmbH, Hannover (DE)

( * ) Notice: Subject to any disclaimer, the term of this patent is extended or adjusted under 35 U.S.C. 154(b) by 173 days.

(21) Appl. No.: 12/867,312

(22) PCT Filed: Feb. 9, 2009

(86) PCT No.: PCT/EP2009/051454

§ 371 (c)(1),
(2), (4) Date: Nov. 15, 2010

(87) PCT Pub. No.: WO2009/101054

PCT Pub. Date: Aug. 20, 2009

(65) Prior Publication Data

US 2011/0043272 A1 Feb. 24, 2011

(30) Foreign Application Priority Data

Feb. 12, 2008 (DE) .......................... 10 2008 008 666

(51) Int. Cl.
*H03K 3/00* (2006.01)

(52) U.S. Cl. ....................................... 327/108; 327/530

(58) Field of Classification Search .................. 327/108, 327/530

See application file for complete search history.

(56) References Cited

U.S. PATENT DOCUMENTS

| 5,892,893 | A | 4/1999 | Hanf et al. |
|---|---|---|---|
| 2002/0162037 | A1 | 10/2002 | Woods et al. |
| 2005/0023898 | A1 | 2/2005 | Eckert et al. |
| 2008/0212254 | A1 | 9/2008 | Arndt et al. |

FOREIGN PATENT DOCUMENTS

| DE | 10330451 B3 | 9/2004 |
|---|---|---|
| EP | 0798626 B1 | 7/2001 |
| EP | 1256870 A2 | 11/2002 |
| WO | 2006058866 A1 | 6/2006 |

*Primary Examiner* — Kenneth B. Wells

(74) *Attorney, Agent, or Firm* — Laurence A. Greenberg; Werner H. Stemer; Ralph E. Locher

(57) ABSTRACT

A circuit includes a switching unit, a switching element, and a control unit. The control unit provides at least one supply signal depending on a switching position of the switching element. An advance signal and the supply signal(s) of the control unit are assigned to the switching unit on the input side. The switching unit supplies and controls predetermined components of the switching unit, which are configured to control the switching element in accordance with the advance signal in such a way that the components activate the switching element. The switching unit is also configured to detect the supply signal(s) present once the switching element has been activated and in response thereto to switch to supplying the predetermined components by way of the supply signal(s).

5 Claims, 3 Drawing Sheets

CIRCUIT ARRANGEMENT

BACKGROUND OF THE INVENTION

Field of the Invention

The invention relates to a circuit arrangement having a switching unit, a switching element and a control unit.

In modern motor vehicles certain electrical components of the motor vehicle, such as e.g. ventilation structural units for cooling the engine or the heating units, continue to remain energized for a predefined period of time after the respective ignition has been switched off. Furthermore, in order to operate in a trouble-free manner many electrical components of the motor vehicle, such as e.g. control units, require to be in a defined switch-off state before being switched off, said switch-off state being reached for example through execution of a predefined exit function of a predefined program. Other electrical components require predefined data to be stored, said data requiring to be transmitted and received by means of a communication network, for example, already before the motor vehicle is switched off. Operations of said type consequently require a reliable voltage supply even after the motor vehicle has been switched off so that a trouble-free start of the motor vehicle is assured next time.

DE 103 30 451 B3 discloses a device for waking up a control unit in a means of transportation, the device having a power supply circuit for the control unit in order to switch the latter from a normal operating state to an idle state, and having a wakeup means which, when actuated by way of a pulse shaper circuit and a drive circuit, connects through the power supply in order to return the control unit to the normal operating state by actuation of a switching means. The actuated switching means connects through the power supply to the drive circuit so that the switching means remains through-connected even when the wakeup means is not actuated, until such time as it is actively switched off.

BRIEF SUMMARY OF THE INVENTION

The object underlying the invention is to disclose a circuit arrangement which ensures predefined components of the motor vehicle can be reliably controlled and supplied with power.

The object is achieved by means of the features of the independent claim. Advantageous embodiments of the invention are characterized in the dependent claims.

The invention is characterized by a circuit arrangement having a switching unit, a switching element and a control unit. The control unit is embodied to make at least one supply signal available as a function of a switch position of the switching element. On the input side the switching unit is assigned a preamble signal and the at least one supply signal of the control unit. The switching unit is embodied to supply and control predefined components of the switching unit which are embodied for controlling the switching element as a function of the preamble signal, and specifically in such a way that said components switch on the switching element. The switching unit is furthermore embodied to detect the at least one supply signal present after the switching element has been activated and, as a function thereof, to switch over to supplying the predefined components by means of the at least one supply signal. The switching unit has a switchover unit to which the preamble signal, the at least one supply signal and a further supply signal can be fed and which has a detection unit which, as a function of the presence of the further supply signal, provides as a component supply signal either the preamble signal or the at least one supply signal via a switch or the further supply signal via a further switch.

Following the detection of the at least one supply signal present or of the further supply signal, the predefined components of the switching unit and consequently the control unit can be reliably supplied by means of the switchover of the supply of the predefined components by means of the supply signal present.

The preamble signal ensures the supply of the predefined components of the switching unit that are necessary for activating the switching element. With the switching element activated, the at least one supply signal is generated by means of the control unit, said supply signal in turn being fed to the switching unit, and serves for further supplying the predefined components. Thus, even when the preamble signal is applied briefly, it is ensured that the control unit will be supplied by means of the at least one supply signal. Since the at least one supply signal is generated by means of the control unit, the control unit can autonomously monitor its supply and control.

According to an advantageous embodiment the switching unit comprises a communications interface. In this case the switching unit is embodied to receive a predefined message from the control unit during the supply by means of the at least one supply signal and as a function thereof to control the predefined components of the circuit arrangement in such a way that the switching element continues to remain activated or is deactivated.

The control unit can independently monitor its supply and control as a function of the transmitted message. This ensures the control unit is reliably supplied even if the preamble signal is switched off. The further supply of the control unit can be ensured by means of the predefined message or else the supply of the control unit can be interrupted and switched off.

According to another advantageous embodiment the switching unit is embodied to control the predefined components of the circuit arrangement as a function of a predefined control signal.

Controlling the predefined components for the purpose of controlling the switching element can be predefined by means of the predefined control signal. This means that in the event of a problem and/or in the event of an overload the switching unit and the control unit can be reliably switched off and damage to the switching unit and the control unit can be reliably prevented.

According to a further advantageous embodiment the switching unit is embodied to supply the predefined components without interruption during the switchover to the supply by means of the at least one supply signal.

Uninterruptedly supplying the predefined components for the purpose of controlling the switching element enables the control unit to be operated reliably, in particular during the switchover to the supply by means of the at least one supply signal.

Exemplary embodiments of the invention are explained in more detail below with reference to the schematic drawings, in which:

DESCRIPTION OF THE INVENTION

Elements of like construction or function are labeled by like reference signs throughout the figures.

Figure 1:
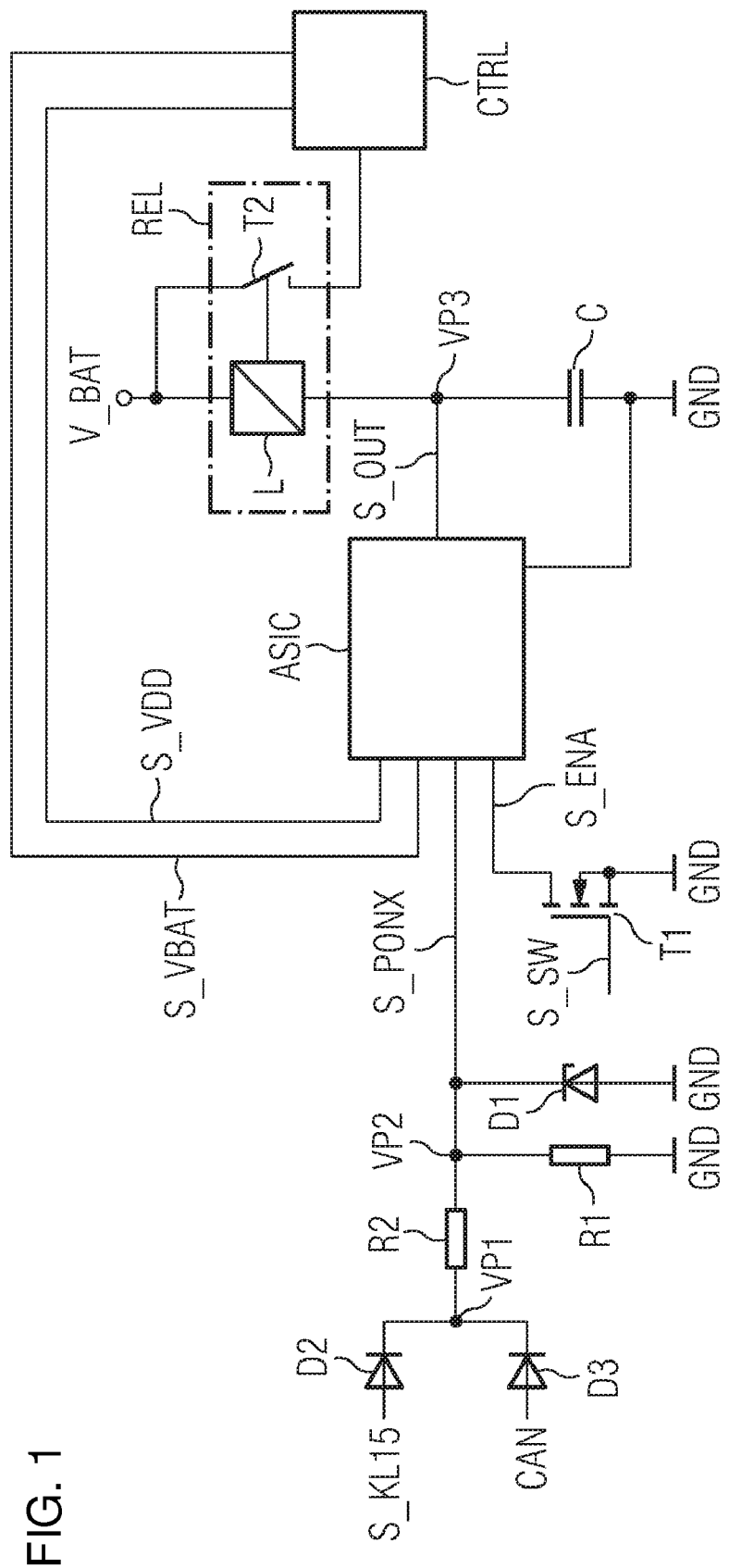
FIG. 1 shows a circuit arrangement having a switching unit, a switching element and a control unit.

FIG. 1 shows a circuit arrangement having a switching unit ASIC, a switching element REL and a control unit CTRL. The switching unit ASIC is embodied for example as an application-specific integrated circuit component. On the input side the switching unit ASIC is assigned a preamble signal S_PONX which is embodied for example as an ignition signal S_KL15 of an ignition of a motor vehicle and consequently is present at least for a predefined period of time after the ignition of the motor vehicle has been switched on. Alternatively, however, the preamble signal S_PONX can also be predefined by means of a communications interface CAN which is embodied for example as a controller area network interface. The ignition signal S_KL15 is assigned a first terminal of a first diode D2 and the communications interface CAN is assigned a first terminal of a second diode D3. The diodes D2 and D3 are assigned by means of their second terminal to a first interconnection point VP1, the diodes D2 and D3 being arranged in such a way that they are connected in the forward direction in the direction of the first interconnection point VP1. The two signals can be ORed by means of the diodes D2 and D3 assigned to the ignition signal S_KL15 and the communications interface CAN. In principle, however, it is possible for only one signal to predefine the preamble signal S_PONX.

Furthermore, the first interconnection point VP1 is assigned a first terminal of a resistor R2. The second terminal of the resistor R2 is assigned to a second interconnection point VP2. A further resistor R1 is arranged between the second interconnection point VP2 and a reference potential GND. The resistors R2 and R1 are embodied such that in the event of a fault, such as e.g. during a short-circuit, they limit a current assigned to the short-circuit.

The reference potential GND is embodied for example as the ground of the motor vehicle.

In addition a Zener diode D1 is arranged between the second interconnection point VP2 and the reference potential GND. The Zener diode D1 is provided for stabilizing the voltage of the preamble signal S_PONX.

A control signal S_ENA is assigned to the switching unit ASIC on the input side in addition to the preamble signal S_PONX. The control signal S_ENA is generated by means of a control switching element T1. Toward that end the control switching element T1 is embodied for example as an n-channel field-effect transistor and assigned by means of its source terminal to the reference potential GND and by means of its drain terminal to the switching unit ASIC. A switching signal S_SW is applied to the gate terminal of the control switching element T1, by means of which switching signal the switching unit ASIC can be deactivated, such as e.g. for diagnostic purposes.

On the output side the control unit ASIC is assigned an output signal S_OUT which is fed to the switching element REL. The switching element REL can be controlled by means of the output signal S_OUT. The switching element REL is preferably embodied as a switching relay and comprises a coil L in addition to a switch T2. In principle, however, other embodiment variants of the switching element REL that are known to a person skilled in the art can be used. The switch T2 is coupled to the coil L in such a way that when current flows through the coil L an activated switch position of the switch T2 is predefined, whereas when the coil L is currentless a deactivated switch position of the switch T2 is predefined. The coil L and the switch T2 are assigned a voltage supply V_BAT at a first terminal in each case. The voltage supply V_BAT is for example a vehicle electrical system voltage of the motor vehicle which is tapped from the battery of the motor vehicle. In principle, however, the voltage supply V_BAT can also be embodied in some other form. At a second terminal the coil L is assigned the output signal S_OUT at a third interconnection point VP3. Dependent on the output signal S_OUT, the switch T2 of the switching element REL can therefore be either activated or deactivated by means of the coil L. Arranged between the third interconnection point VP3 and the reference potential GND is a capacitor C which is embodied to decouple the second terminal of the coil L from the reference potential GND.

A second terminal of the switch T2 is assigned to the control unit CTRL on the input side. The control unit CTRL can be embodied for example as a control device of the motor vehicle, such as e.g. an engine management unit. With the switch T2 activated, the supply voltage V_BAT is present at the control unit CTRL. Accordingly, the control unit CTRL is controlled and supplied with the supply voltage V_BAT as a function of the output signal S_OUT of the switching unit ASIC. When the supply voltage V_BAT is applied, the control unit CTRL preferably executes a startup program by means of at least one of the computer units assigned to the control unit CTRL and generates a first supply signal S_VDD and a second supply signal S_VBAT on the output side. The first and second supply signals S_VDD and S_VBAT are in turn fed to the switching unit ASIC on the input side.

Figure 2:
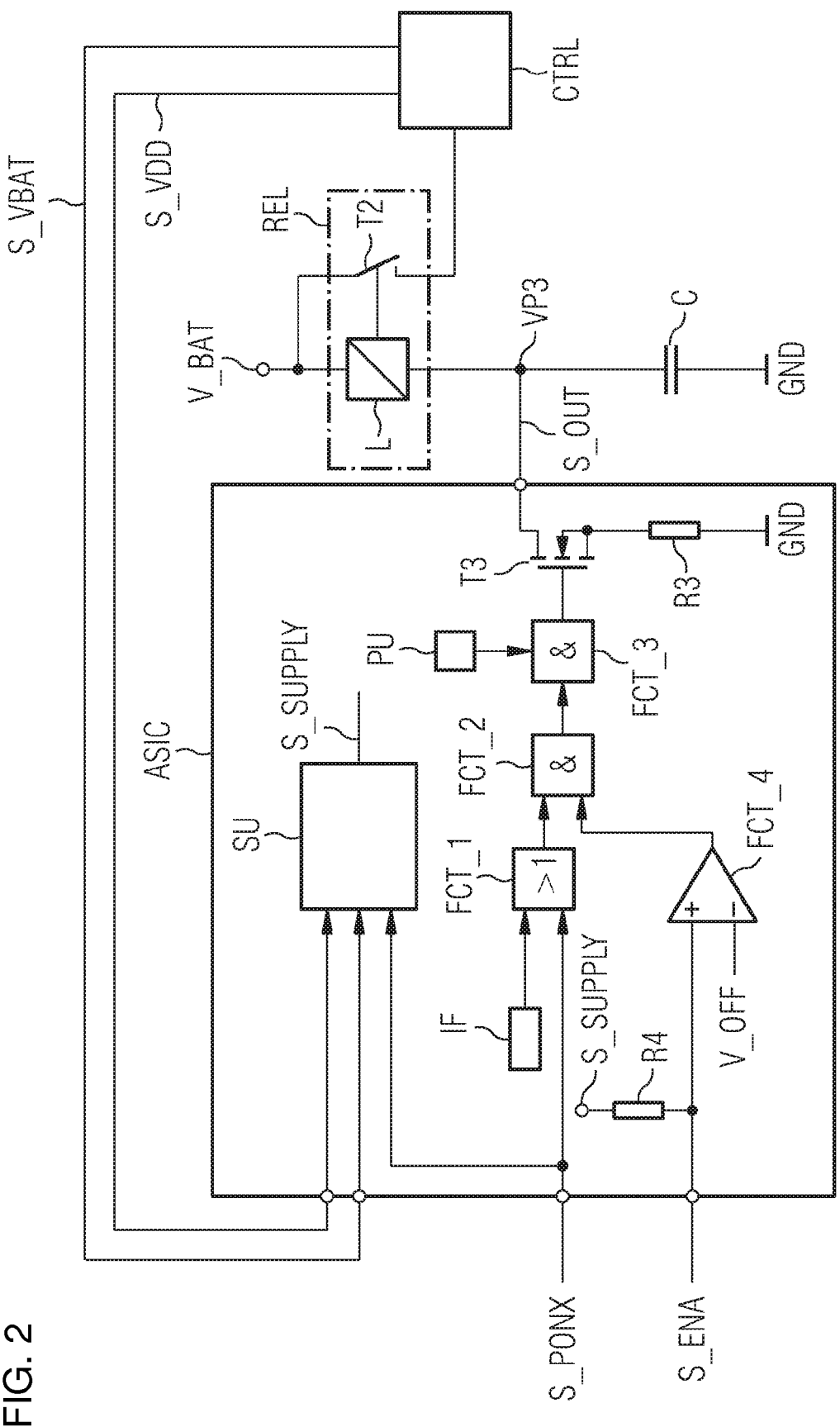
FIG. 2 shows a detailed representation of the switching unit.

The switching unit ASIC is described in more detail with reference to FIG. 2. The switching unit ASIC comprises a switchover unit SU to which the preamble signal S_PONX and the first and second supply signal S_VDD and S_VBAT are fed on the input side. The switchover unit SU is embodied to generate a component supply signal S_SUPPLY as a function of the preamble signal S_PONX and the first and second supply signal S_VDD and S_VBAT present on the input side, which component supply signal is embodied for example as a voltage signal. Predefined components of the switching unit ASIC are supplied by means of the component supply signal S_SUPPLY. The preamble signal S_PONX is also assigned to a first functional unit FCT_1 on the input side. A communications interface IF, which is embodied for example as a serial peripheral interface (SPI), is assigned to the first functional unit FCT_1 on the input side in addition to the preamble signal S_PONX. However, other embodiments of the communications interface IF can be used, such as e.g. a CAN interface. The first functional unit FCT_1 is embodied for example as an OR component and furthermore is embodied to combine the preamble signal S_PONX present on the input side and the communications interface IF present on the input side by means of a logical OR operation and to make the result of the logical OR operation available on the output side to a second functional unit FCT_2.

The control signal S_ENA is fed to a fourth functional unit FCT_4 on the input side. The fourth functional unit FCT_4 is preferably embodied as a comparator. The control signal S_ENA is assigned a pull-up resistor R4 which is coupled to the component supply signal S_SUPPLY at its first end and to the control signal S_ENA by means of its second end. The fourth functional unit FCT_4 embodied as a comparator compares a voltage value of the control signal S_ENA present on the input side with a predefined comparison voltage V_OFF which is present on the input side and has, for example, a voltage value of 0.5 V. If the voltage value of the control signal S_ENA is greater in terms of absolute value than the comparison voltage V_OFF, for example, then the fourth functional unit FCT_4 generates a High level on the output side. If the voltage value of the control signal S_ENA is less in terms of absolute value than the comparison voltage V_OFF, for example, then the fourth functional unit FCT_4 generates a Low level on the output side.

In this connection let it be pointed out that a High level represents for example a logic 1 and a Low level represents a logic 0.

The output of the fourth functional unit FCT_4 embodied as a comparator is likewise assigned to the second functional unit FCT_2 on the input side. The second functional unit FCT_2 is preferably embodied as an AND component and furthermore embodied to combine the output signal of the fourth functional unit FCT_4 present on the input side and the output signal of the first functional unit FCT_1 present on the input side by means of a logical AND operation and to make the result of the logical AND operation available to a third functional unit FCT_3 on the output side.

The third functional unit FCT_3 is embodied as an AND component, analogously to the second functional unit FCT_1. An output of a monitoring unit PU is assigned to the third functional unit FCT_3 on the input side in addition to the output of the second functional unit FCT_2. The monitoring unit PU monitors for example environmental parameters of the switching unit ASIC, such as e.g. an operating temperature, voltage values and/or current values of the switching unit ASIC and/or the control unit CTRL. On the output side the third functional unit FCT_3 is assigned to a control switching element T3 which is embodied for example as an n-channel field-effect transistor. The output of the third functional unit FCT_3 is coupled to the gate terminal of the control switching element T3. The control switching element T3 is assigned by means of its source terminal to a resistor R3, the resistor R3 being assigned to the reference potential GND by means of its end facing away from the control switching element T3. The control switching element T3 is assigned by means of its drain terminal to the switching element REL and consequently represents the output signal S_OUT at the drain terminal.

At a startup time of the motor vehicle the preamble signal S_PONX is present on the input side at the switchover unit SU of the switching unit S_SUPPLY. At this time the first and second supply signal S_VDD and S_VBAT typically are not yet present. The switchover unit SU generates the component supply signal S_SUPPLY on the output side as a function of the preamble signal S_PONX. The component supply signal S_SUPPLY makes a supply voltage available to all the components of the switching unit ASIC that are required for controlling the switching element REL. The components include the functional units FCT_1, FCT_2, FCT_3 and FCT_4, as well as the communications interface IF and the monitoring unit PU and possibly other components required for controlling the switching element REL. For example, the component supply signal S_SUPPLY makes a voltage of between 5 V and 12 V available to the predefined components of the switching unit ASIC.

Since the pull-up resistor R4 is also supplied at its first end by means of the present component supply signal S_SUPPLY, if the control switching element T1 is deactivated, the control signal S_ENA predefines, at the input of the fourth functional unit FCT_4 embodied as a comparator, a voltage value which is greater than the comparison voltage V_OFF. Thus, the fourth functional unit FCT_4 predefines a High level on the output side for the second functional unit FCT_2 embodied as an AND component. When the preamble signal S_PONX is present at the first functional unit FCT_1, the latter also predefines a High level on the output side for the second functional unit FCT_2. Accordingly, the logical AND operation of the second functional unit FCT_2 is fulfilled and on the output side a High level is predefined for the third functional unit FCT_3 embodied as an AND component. If no overtemperature and/or no overvoltage and/or no overcurrent are/is detected in the switching unit ASIC and/or control unit CTRL by means of the monitoring unit PU, the monitoring unit PU also predefines a High level on the output side for the third functional unit FCT_3, with the result that the logical AND operation is also fulfilled here. The third functional unit FCT_3 generates a High level on the output side and consequently controls the control switching element T3 in such a way that the output signal S_OUT predefines the reference potential GND. As a result the supply voltage V_BAT is present at the first terminal of the coil L and the reference potential GND at the second terminal, such that there flows through the coil L of the switching element REL a current which leads to the activation of the switch T2 and consequently feeds the supply voltage V_BAT to the control unit CTRL.

The control unit CTRL is embodied to generate the first and second supply signal S_VDD and S_VBAT when the supply voltage V_BAT is present and feed them to the switching unit ASIC. The control unit CTRL is furthermore embodied to control the communications interface IF of the control unit ASIC by means of a message transmission. The communications interface IF is embodied to predefine, as a function of the received message of the control unit CTRL, either a High level or a Low level of the first functional unit FCT_1 embodied as an OR component on the output side.

In addition to the preamble signal S_PONX, the first and second supply signal S_VDD and S_VBAT therefore are now also present on the input side at the switchover unit SU. The switchover unit SU is embodied to detect the presence of at least one supply signal and, as a function thereof, to generate the component supply signal S_SUPPLY as a function of the at least one detected supply signal. With the presence of the at least one supply signal, the preamble signal S_PONX is consequently not used further for supplying the components for controlling the switching element REL and therefore no longer subject to load. This is advantageous in particular when the preamble signal S_PONX is present only for a predefined period of time after the starting of the motor vehicle, in which event the preamble signal S_PONX should be applied long enough for at least one supply signal to be present at the switching unit ASIC on the input side.

For example, the switchover unit SU is embodied to detect the first supply signal S_VDD and, if said signal is detected, to generate the component supply signal S_SUPPLY as a function thereof. In principle, however, the switchover unit SU can also be embodied to detect a plurality of supply signals and select accordingly. In this case, given a plurality of supply signals, priorities can be predefined in each case such that when all the supply signals are present, the one having the highest priority is selected to generate the component supply signal S_SUPPLY. If the latter fails due to an error, the supply signal with the next highest priority is selected.

Thus, the supply of the components of the switching unit ASIC continues to be assured even if the preamble signal S_PONX drops out. In order to ensure further control of the switching element REL when the preamble signal S_PONX is not present, the control unit CTRL transmits a predefined message to the communications interface IF of the switching unit so that the latter will predefine a High level for the first functional unit FCT_1 and consequently the switching element REL will continue to remain activated.

Since the supply voltage V_BAT is present at the switching element REL even when the ignition of the motor vehicle is switched off, the control unit CTRL can continue to be operated even after the ignition switch-off time and therefore to control fans, for example, and/or other electrical loads of the motor vehicle.

If further control and/or supply of loads of the motor vehicle is not necessary, for example after a predefined period of time after the ignition switch-off time at which the preamble signal S_PONX is not present, the control unit CTRL can control the communications interface IF of the switching unit ASIC by means of a predefined message such that the switching unit predefines a Low level and consequently a logical AND operation is no longer predefined for the second functional unit FCT_2. As a function thereof, the third functional unit FCT_3 embodied as an AND component also predefines a Low level on the output side and consequently switches off the control switching element T3. As a result a flow of current through the coil L of the switching element REL is interrupted and the switch T2 is opened. The control unit CTRL is therefore separated from the supply voltage V_BAT and consequently can also no longer predefine the first and second supply signal S_VDD and S_VBAT. As a result of the dropping-out of the supply signals S_VDD and S_VBAT the switchover unit SU cannot generate the component supply signal S_SUPPLY and can no longer supply the components of the switching unit ASIC. As a consequence the switching unit ASIC is no longer supplied. Only a minimal closed-circuit current therefore flows and the battery is essentially not subject to load.

If an overtemperature and/or an overvoltage and/or an overcurrent are/is detected in the switching unit ASIC and/or in the control unit CTRL by means of the monitoring unit PU during the time the switching element REL is switched on, the control unit CTRL predefines a Low level to the third functional unit FCT_3 so that the logical AND operation is no longer fulfilled and consequently the switching element REL is switched off. This is particularly advantageous in order to avoid damage to the control unit CTRL and/or the switching unit ASIC.

In the event of an error the control signal S_ENA can also be predefined such that the voltage value of the control signal S_ENA is less in terms of absolute value than the comparison voltage V_OFF, with the result that the fourth functional unit FCT_4 embodied as a comparator predefines a Low level on the output side and consequently the logical AND operation of the second functional unit FCT_2 is no longer fulfilled. Consequently the switch T2 of the switching element REL is likewise opened.

The control signal S_ENA can be predefined by means of the switching signal S_SW. In a preferred exemplary embodiment the control signal S_ENA can be predefined by the monitoring unit PU.

Figure 3:
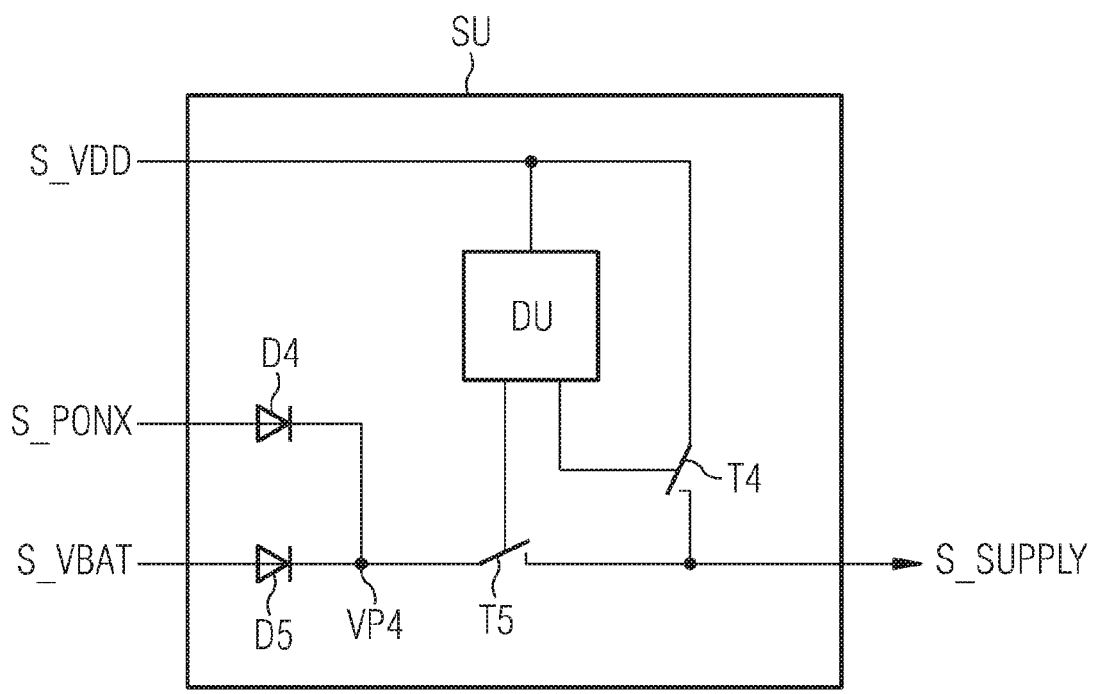
FIG. 3 shows a representation of a switchover unit.

The switchover unit SU is described in more detail with reference to FIG. 3. The preamble signal S_PONX is assigned to a fourth interconnection point VP4 by means of a third diode D4. The second supply signal S_VBAT is assigned to the fourth interconnection point VP4 by means of a fourth diode D5. The preamble signal S_PONX and the second supply signal S_VBAT are merged at the fourth interconnection point VP4. The third and fourth diode D4 and D5 are arranged in such a way that when a current is applied to them they are operated in the forward direction in the direction of the fourth interconnection point VP4. An ORing of the preamble signal S_PONX and the second supply signal S_VBAT can be realized by means of the third and fourth diode D4 and D5. In principle, however, other embodiments of an ORing that are known to the person skilled in the art can also be used.

The fourth interconnection point VP4 is assigned to a switch T5. The switch T5 is controlled by means of a detection unit DU. The first supply signal S_VDD is fed to a further switch T4. The further switch T4 is also controlled by means of the detection unit DU. The first supply signal S_VDD is also fed to the detection unit DU on the input side.

The component supply signal S_SUPPLY is assigned to the switch T5 and the further switch T4 on the output side.

The detection unit DU is embodied to sense the first supply signal S_VDD and to control the switch T5 and the further switch T4 as a function thereof. In this case the switches T4 and T5 are preferably controlled in a complementary manner such that when the switch T5 is in the closed switch position, an open switch position is predefined for the further switch T4. The detection unit DU is embodied for example as an inverter in order to invert the control of the switch T5 for controlling the further switch T4.

If, for example, the first supply signal S_VDD is not present, the switch T5 is closed and the preamble signal S_PONX present or the second supply signal S_VBAT is assigned to the component supply signal S_SUPPLY. The further switch T4 is typically open at this moment in time.

If, for example, the first supply signal S_VDD is present after a predefined period of time, said signal is sensed by means of the detection unit DU and the further switch T4 is closed and the switch T5 opened. In this case a closed switch position of the switch T5 can overlap in time with a closed switch position of the further switch T4, with the result that the component supply signal S_SUPPLY can be predefined without interruption. In principle the uninterrupted predefinition of the component supply signal S_SUPPLY can also be ensured by means of an energy store, such as e.g. by means of a capacitor. However, other embodiments that are known to the person skilled in the art for continuously predefining the component supply signal S_SUPPLY are also conceivable. In the present exemplary embodiment the first supply signal S_VDD has the highest priority and supplies the predefined components of the switching unit ASIC as soon as it is detected. If the first supply signal S_VDD drops out due to an error for example, said dropping-out is sensed by means of the detection unit DU and the switch T5 is closed and the further switch T4 opened. The component supply signal S_SUPPLY is therefore assigned to the second supply signal S_VBAT and/or to the preamble signal S_PONX if these are present.

In a further preferred exemplary embodiment the switching unit ASIC comprises further components which are embodied for controlling other control units and/or further electrical loads. The further components are supplied by means of the component supply signal S_SUPPLY of the switchover unit SU only as soon as the component supply signal S_SUPPLY is assigned either to the first supply signal S_VDD or to the second supply signal S_VBAT. If only the preamble signal S_PONX is present, only those components are supplied that are required for controlling the switching element REL and consequently for controlling the control unit CTRL. In this way the preamble signal S_PONX is not subjected to an unnecessarily heavy load.

The control unit CTRL, the switching element REL and the switching unit can each be implemented separately. In principle it is, however, also possible to integrate the switching unit ASIC and the switching element REL into the control unit CTRL so that a compact structural design of the circuit arrangement can be realized.

The invention claimed is:

1. A circuit arrangement comprising:
a switching unit having an input side connected to receive a preamble signal;
a switching element having a switch position conducting a supply signal; and
a control unit connected to said switching element and said switching unit and configured to provide the supply signal in dependence on the switch position of said switching element;
said switching unit being configured to supply and control, as a function of the preamble signal, predefined components of the circuit for turning on said switching element;
said switching unit being configured to detect, after said switching element has been switched on, a presence of the supply signal and, in dependence thereof, to switch over to supplying the predefined components by way of the supply signal;
said switching unit including a switchover unit connected to receive the preamble signal, the supply signal, and a further supply signal;
said switchover unit having a detection unit, a first switch connected to conduct the preamble signal or the supply signal and a second switch connected to conduct the further supply signal, said detection unit, depending on a presence of the further supply signal, causing said first switch to provide the preamble signal or the supply signal as a component supply signal, or causing said second switch to provide the further supply signal as the component supply signal.

2. The circuit arrangement according to claim 1, wherein said switching unit includes a communications interface and said switching unit is configured to receive a predefined message from said control unit during a supply by way of the further supply signal and, as a function thereof, to control the predefined components in such a way that said switching element continues to remain activated or is deactivated.

3. The circuit arrangement according to claim 1, wherein said switching unit is configured to control the predefined components as a function of a predefined control signal.

4. The circuit arrangement according to claim 3, wherein the predefined control signal is configured to selectively turn said switching unit off.

5. The circuit arrangement according to claim 2, wherein said switching unit is configured to supply the predefined components without interruption during the switchover to the supply by way of the further supply signal.

* * * * *